(12) United States Patent
Pique Torra

(10) Patent No.: US 10,721,854 B2
(45) Date of Patent: Jul. 28, 2020

(54) MACHINE FOR PICKING UP ROCKS FROM THE SOIL

(71) Applicant: Antonio Pique Torra, Lerida (ES)

(72) Inventor: Antonio Pique Torra, Lerida (ES)

( * ) Notice: Subject to any disclaimer, the term of this patent is extended or adjusted under 35 U.S.C. 154(b) by 6 days.

(21) Appl. No.: 16/052,542

(22) Filed: Aug. 1, 2018

(65) Prior Publication Data

US 2019/0075705 A1   Mar. 14, 2019

(30) Foreign Application Priority Data

Sep. 8, 2017 (ES) ............................... 201731040 U

(51) Int. Cl.
*A01B 43/00* (2006.01)
*A01B 33/12* (2006.01)
*A01B 33/10* (2006.01)

(52) U.S. Cl.
CPC .............. *A01B 43/00* (2013.01); *A01B 33/10* (2013.01); *A01B 33/12* (2013.01)

(58) Field of Classification Search
CPC ....... A01B 33/10; A01B 33/103; A01B 33/12; A01B 33/125; A01B 43/00
USPC .......................................................... 171/63
See application file for complete search history.

(56) References Cited

U.S. PATENT DOCUMENTS

| | | | | |
|---|---|---|---|---|
| 2,484,437 A * | 10/1949 | Wells | ................... | A63B 47/021 |
| | | | | 414/440 |
| 3,739,855 A * | 6/1973 | Bliss | ...................... | A01B 43/00 |
| | | | | 171/63 |
| 4,187,946 A * | 2/1980 | Stevenson | ............... | A01M 5/00 |
| | | | | 209/674 |
| 4,214,336 A * | 7/1980 | Peterson | ................... | E01H 1/00 |
| | | | | 15/3 |
| 4,364,434 A * | 12/1982 | Erholm | .................. | A01B 43/00 |
| | | | | 171/63 |
| 4,482,019 A * | 11/1984 | Murphy | .................. | E01H 1/042 |
| | | | | 171/130 |
| 5,901,911 A * | 5/1999 | Davis | ..................... | A01K 31/04 |
| | | | | 241/101.72 |
| 9,271,472 B2 * | 3/2016 | Clark | ...................... | A01K 1/015 |
| 9,770,008 B2 * | 9/2017 | Clark | ....................... | A01K 1/01 |
| 10,492,362 B2 * | 12/2019 | Albaek | .................. | A01D 34/62 |

* cited by examiner

*Primary Examiner* — Gary S Hartmann
(74) *Attorney, Agent, or Firm* — The Morales Law Firm; Joseph L. Morales

(57) ABSTRACT

A machine for picking up rocks from soils having a structure suitable for being moved over the surface of the soil. The machine has a pair of side wheels, being towed by a tractor vehicle from which it receives movement through its power take-off. The machine has rock extraction and uprooting elements incorporated on the advancing edge of the machine, made in the form of teeth, associated with a tooth bar region of the structure of the machine, having certain play, a rotating movable feed reel with teeth, a conveyor belt for lifting said rocks up through an inclined plane from a leading edge to a trailing edge located at a greater height; a rock collection and accumulation hopper arranged on the trailing edge.

12 Claims, 8 Drawing Sheets

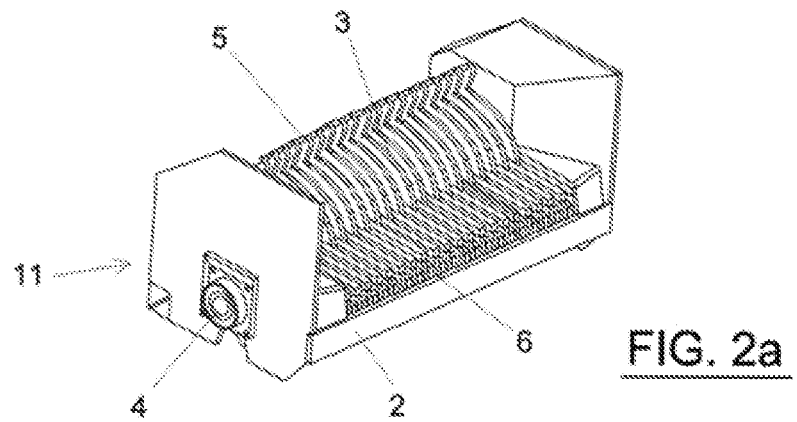
FIG. 2a
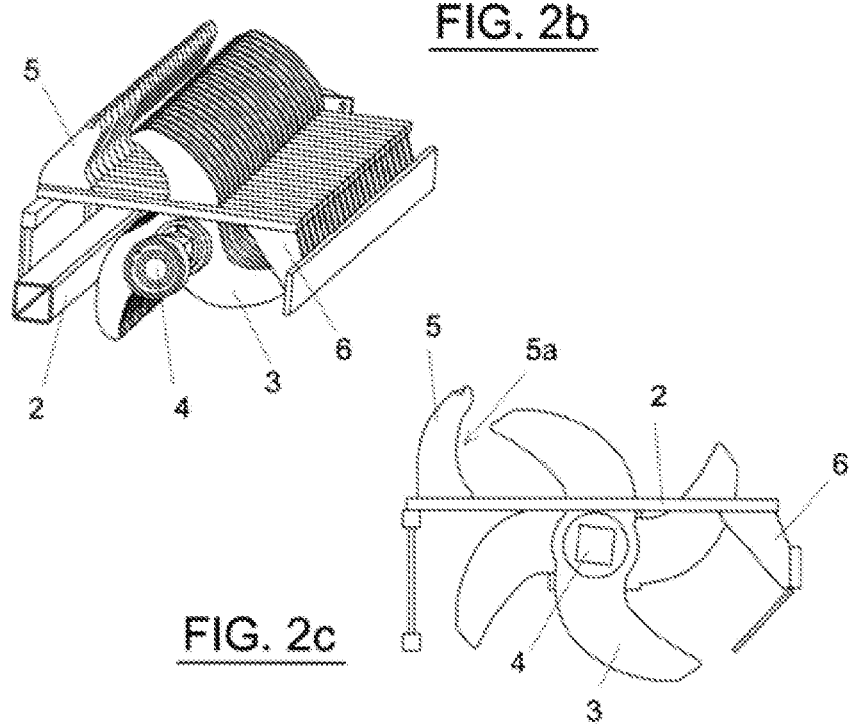
FIG. 2b
FIG. 2c

MACHINE FOR PICKING UP ROCKS FROM THE SOIL

CROSS-REFERENCE TO RELATED APPLICATIONS

The present application claims priority from Spanish patent application number U 201731040, filed on Sep. 8, 2017, which is hereby incorporated by reference in its entirety

FIELD OF THE INVENTION

The present invention relates to a machine for picking up rocks from the soil, which provides essential novelty features and considerable advantages with respect to the means known and used for the same purposes in the current state of the art.

The field of application of the invention is comprised in the industrial sector dedicated to the manufacture of agricultural machinery.

BACKGROUND OF THE INVENTION

Those skilled in the art are well aware of the need to perform operations for picking up rocks from soils for collecting and removing rocks having sizes exceeding a given pre-established limit for the purpose of conditioning the soil for crop and/or livestock farming or development.

A wide range of machines that are in charge of performing this conditioning work are known in the current state of the art, most of which machines share a common operating feature that consists of providing a frame prepared to be towed by a tractor vehicle, which machines have in the front part (according to the working direction) extraction means prepared to be driven into the ground (for example, strong teeth-like metallic elements), sized to reach up to a limited depth, such that with the towing of the machine by the tractor vehicle, said extraction elements are driven over the soil, thereby causing rocks or other objects exceeding previously determined size to reach the surface of the soil.

However, these machines do not have means for stockpiling these surfaced rocks and completely cleaning the dirt off of them, and clods often times adhere to said rocks, increasing weight and volume when transporting them off the soil.

SUMMARY OF THE INVENTION

The machine of the invention generally comprises the following configuration:
  In the mouth of the machine, there is arranged in a parallel manner and with a certain elevation, a rotating feed reel, said reel comprising a shaft attached to a series of arms, arranged in a radial manner and parallel to one another, at the end of which there may optionally be teeth made of an anti-wear material, arranged with a suitable inclination, such that upon rotation, said teeth push rocks and other materials into the machine and onto a conveyor belt, said reel being fixed to swinging side arms which allow the upward and downward movement of the reel, thereby allowing the passage of rocks. This element, together with the main operation of picking up rocks, is an operative improvement for destroying weeds, breaking up and clearing the soil of clods, and keeping the inlet or mouth of the machine clean, preventing aggregates from being driven, and achieving better performance of the machine;
  Additionally, the conveyor belt on which are the rocks extracted from the soil are deposited can be provided with an ejector device, as a result of which the machine is able to work year-round regardless of the viscosity conditions of the soil. The device includes a group of rotating blades, made up of a plurality of blades inserted along a common shaft and adjacent to one another, separated by a predetermined pitch, the blades being designed such that with the rotation thereof, they break up the clods dumped thereon from the driving belt, sieving the material such that both the crumbled up dirt and smaller-sized rocks fall into the soil, and transferring to the collection receptacle (generally a hopper) only those rocks that exceed a pre-established size;
  It can also incorporate for each side chain of the conveyor belt a guiding sprocket which can be positioned in height in order to keep the respective chains positioned in the upper part, to prevent rocks from getting between the lower inlet guide and the chain, and to thereby prevent possible jams;
  It can also incorporate elastic skirts on the chains on both sides, for the purpose of preventing rocks from getting between the links of the chains;
  It can also incorporate supporting and guiding rollers for moving the chains, which have the dual purpose of preventing on one hand premature wear thereof, and successively providing on the other hand corrugated, upwardly concave sections of the belt conveying the material, with the added advantage that this configuration causes greater friction and movement between the materials on the belt, with the subsequent breaking up of the clods, and thereby sieving aggregates while traveling;
  It can incorporate means for unloading the materials (essentially rocks) deposited in a collection hopper onto a trailer or other means of transport, by means of lifting said hopper due to the action of hydraulic or pneumatic cylinders up to the height of said means of transport (for example, a truck, a carriage used for agricultural purposes, or the like), and
  It can incorporate double clutch operation (rotation) reversing means between the power take-off of the tractor and a double-output reducer gear, such that under normal conditions the output shaft rotates in a given direction (for example to the right) by direct transmission from the power take-off, and optionally after the activation of a piston acting on the double clutch, it disengages from the direct transmission and connects to a hydraulic motor that rotates the output take-off in the opposite direction (for example to the left); the movement in the opposite direction is utilized for the purpose of unjamming the machine, after which the mechanism can be reconnected to the power take-off of the vehicle by means of actuating the piston in the opposite direction.

A highly productive machine which picks up rocks from the soil, leaving the greatest amount of dirt possible therein and only extracting rocks and stones of a given caliber and larger, and which can work year-round, is thereby obtained.

BRIEF DESCRIPTION OF THE DRAWINGS

These and other features and advantages of the invention will become clearer based on the following detailed description of a preferred embodiment thereof, given solely by way of illustrative and non-limiting example in reference to the attached drawings, in which:

FIGS. 2a to 2c are schematic top perspective, side perspective, and end elevational views, respectively, of the ejector device designed for being incorporated in the rock picker;

DETAILED DESCRIPTION OF THE INVENTION

Figure 1:
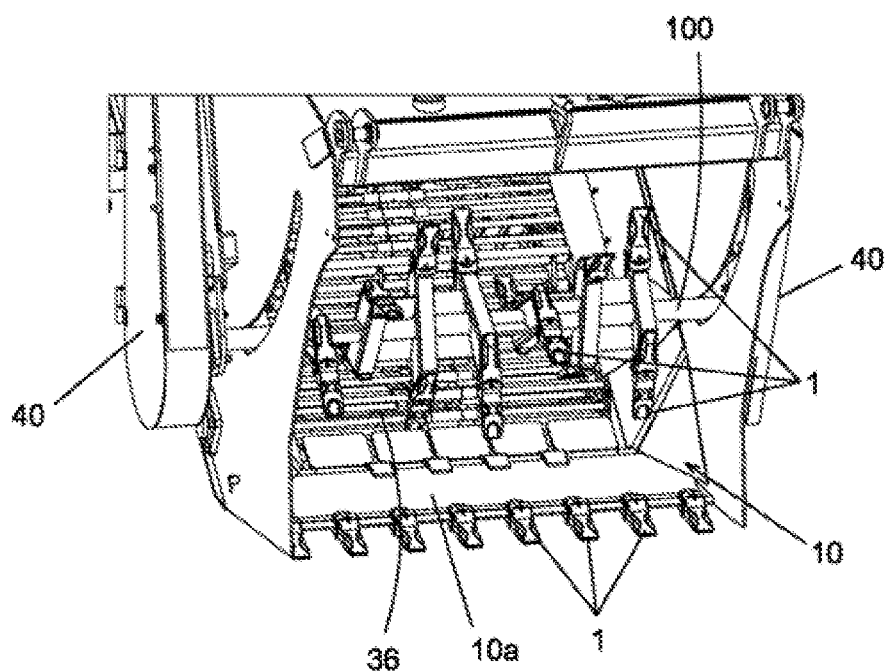
FIG. 1 is a schematic top perspective view of the mouth of the machine of the invention, where the teeth intended for being driven into the soil together with the reel bearing a second plurality of collaborating teeth according to the teachings of the present invention can be seen.

As mentioned above, the detailed description of the preferred embodiment of the object of the invention will be provided below in reference to the attached drawings, in which the same reference numbers are used to designate identical or similar parts. Therefore, first taking FIG. 1 of the drawings into account, a schematic depiction of an embodiment can be seen in which the various extraction elements incorporated on the advancing edge of the machine, made in the form of teeth (1), associated with the tooth bar region (10a) of the structure (10) of the rock picker, having certain play, with which other teeth (1) of the same type incorporated on a rotating reel (100) collaborate, the teeth (1) and the tooth bar (10a) being built using anti-wear steel for the purpose of extending the service life of the machine, and each tooth (1) of those incorporated in the tooth bar region (10a) of the structure (10) being arranged at a predetermined angle with respect to the surface of the soil determined as being optimal for operations consisting of eliminating weeds and clearing away clods, the inlet of the machine to the conveyor belt (36) therefore being kept cleaner and at the same time preventing aggregates from being driven. The reel (100) is assembled on swinging side arms (40) which allow the upward and downward movement of the reel (100), thereby allowing the passage of the rocks.

In turn, FIGS. 2a to 2c illustrate three views of an ejector device (11) designed for being located in the machine in an intermediate position between the trailing edge of the conveyor belt (not visible in the drawings) and a rock receiving hopper (18) (not visible in these drawings), the purpose of which essentially consists of subjecting the materials moved by the conveyor belt (rocks, dirt, aggregates, etc.) to a sieving operation for the purpose of trying to get only those rocks having a size greater than a predetermined limit to get to the hopper (18) free of clods or other substances. The ejector device (11) comprises a strong metal frame (2) housing therein a plurality of blades (3) which are successively attached in an integral manner to a rotating shaft (4), and which blades (3) are opposite a first series of counter-blade portions (5) emerging from a side of the frame (2) in respectively alternating positions with respect to the blades (3) and taking a curvilinear inner profile (5a) converging with the path of the end of the blade (3) according to the direction of rotation of the blades, and also opposite a second series of counter-blade portions (6) projecting with an inclination diverging slightly towards the outside from a side of the frame diametrically opposite the aforementioned side, and taking up like the first counter-blade portions (5) alternating positions with respect to the blades (3). The separation (or pitch) between successive blades (3) is equivalent to that of the counter-blades (5, 6), allowing the passage of said blades (3) through the separating spaces of the counter-blades (5, 6), and thereby assuring the destruction of clods or other unwanted substances, and therefore sieving the materials according to their size. As will be understood, a device like the one described is particularly useful in cases in which the soil is wet, and therefore clumped portions of dirt in the form of clods are raised up.

Figure 3:
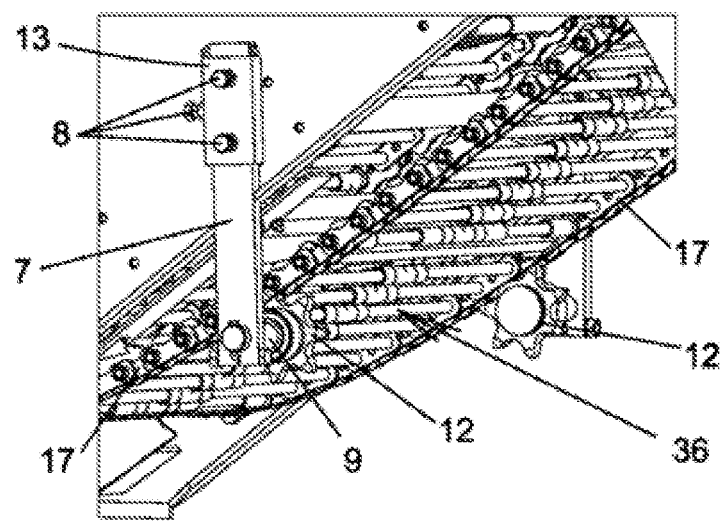
FIG. 3 illustrates a depiction of a guiding device for the side chains of the conveyor belt.

Now in reference to FIG. 3, said figure shows a guiding device for a chain, which device has been incorporated by the invention in the rock picker in the front position, i.e., in the area of entrance of the materials uprooted by the teeth (1) of the machine, for the purpose of assuring that the side chains (17) of the conveyor belt (36) are kept at a predetermined height. Essentially, the device comprises a rigid upright (7), provided at one of its ends (specifically, the end taking up the upper position) with means for coupling to the structure (10) of the machine and fixing by means of screws (8) screwed into a tubular sleeve (13) inside which it is able to move, whereas in relation to the opposite end (specifically, the end taking up the lower position) it includes an orthogonal shaft (9) holding a sprocket wheel (12) with which the corresponding chain (17) meshes. With this arrangement, the height position of the rigid upright (7) can be adjusted by loosening the screws (8) for the purpose of keeping the sprocket (12) with which the chain (17) on that side meshes at a raised height for suitable preventing rocks from getting between the chain and the corresponding lower guide (not visible in the drawing) which may jam up and/or damage the drive mechanism. As seen in FIG. 3, a guiding device is provided on each side for both side chains (17). The conveyor belt (36) (see FIG. 4) is completed with rods (37) assembled between said side chains (17) leaving gaps (41) for screening the dirt. The rods (37) are telescopic and have an expansion spring (38) for the assembly and disassembly thereof between the links of the side chains (17), as seen in the detail of the disassembled rod on the right side of said FIG. 4. Furthermore, the conveyor belt (36) comprises transverse restraints (39) to improve the upward driving of the uprooted material.

Figure 4:
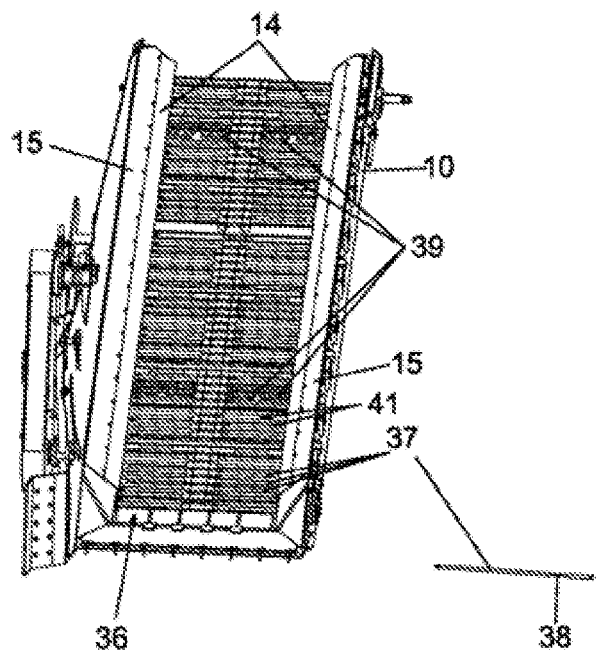
FIG. 4 is a top perspective depiction of the conveyor belt, where elastic skirts protecting the side chains can be seen, and where a detail of one of the rods configuring said conveyor belt can be seen.

In addition to the protections discussed above, the invention has provided for the rock picker to incorporate closing skirts for closing the sides of the conveyor belt (36) preventing rocks from getting into sensitive regions of the machine. Specifically, FIG. 4 shows an embodiment in which respective skirts (14) are shown, extending according to the longitudinal direction of the machine in a position such that they project from side supports (15) of the structure (10) of the machine, completely covering each side chain (17) and thereby preventing any rock from penetrating same. This arrangement is extraordinarily useful if it is taken into account that the side chains (17), located on both sides of the conveyor belt (36), move on guiding rollers (16) (see FIG. 5, where the rods of the conveyor belt (36) have been eliminated to better see said rollers (16) and an upper branch of the chains (17)) spaced successively along the longitudinal driving direction, which causes both the side chains (17) (see FIG. 5) and the conveyor belt assembly to take a longitudinally winding configuration that may favor rocks getting into chain driving regions, and even stop said chain, and with the arrangement of such skirts (14) the occurrence of this drawback is prevented. The skirts (14) are made of a strong but suitably elastic material (preferably a material based on suitably treated steel).

Figure 5:
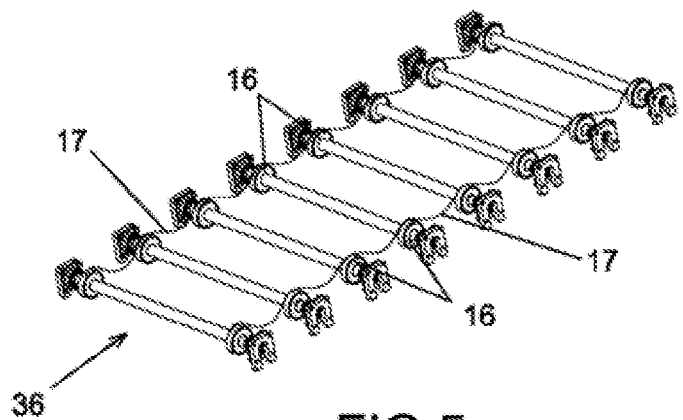
FIG. 5 is a schematic illustration of a series of guiding rollers for the side chains of the conveyor belt.

To prevent the premature wear generated in the movable members when the chains move along rails, as mentioned above, the invention has provided the use of a plurality of guiding rollers (16) located along the path of the chains (17) on both sides, as shown in FIG. 5. This depiction clearly shows the longitudinally winding profile of the chains (17) (and therefore, of the conveyor belt (36) in general), causing the materials that are driven upwards towards the collection hopper to be subjected to the peaks and valleys of such winding path. This fact also helps to break up clods and again constitutes a sieving for the dirt and smaller-sized aggregates that are driven along the conveyor path.

Figure 6A:
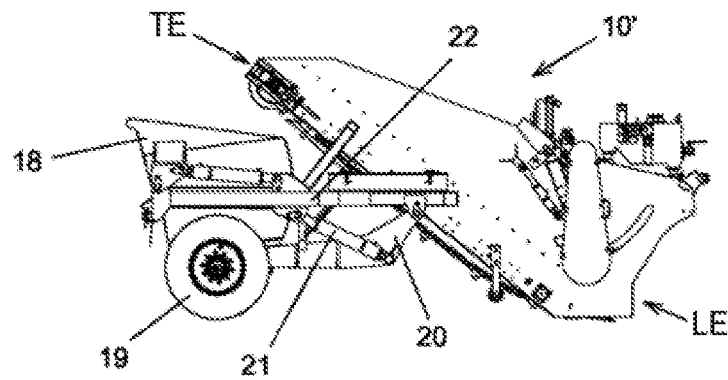
FIGS. 6a and 6b are respective schematic views of a machine built according to the invention, being an optional version with the capability to unload materials onto a trailer or other means of transport, according to a first view of the machine in a functional state and a second view of the machine in the unloading position.
Figure 6B:
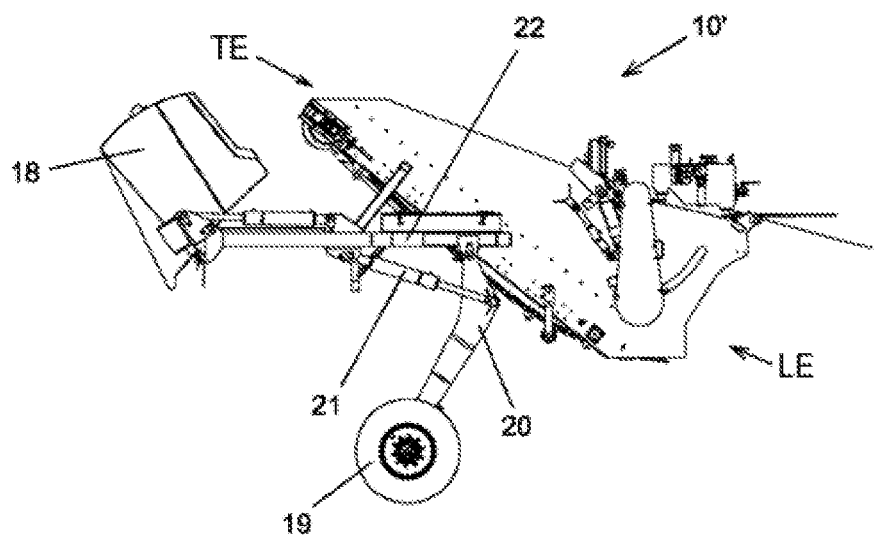

On the other hand, as mentioned above, the machine of the invention provides an optional embodiment with a lifting device that allows unloading materials onto means of transport. According to an embodiment of the invention shown in FIG. 6*a*, the machine (10') includes means articulated on a double chassis, preferably of the hydraulic type, which allow lifting the hopper (18) to a height that is sufficient for being unloaded onto a trailer or another container. FIG. 6*a* shows the machine (10') in the working position, and FIG. 6*b* shows the same machine (10') in the raised position, i.e., in the unloading position.

According to the first depiction (FIG. 6*a*), the structure of the machine provides an inclined plane along which the materials are driven by means of the conveyor belt (not visible in the drawing) made up of rods (37) extending between both side chains (17) (FIGS. 4 and 5), such that the materials uprooted by the teeth (1) present on the leading edge LE move upwards towards the trailing edge TE from where they fall into the collection and accumulation hopper (18). The machine (10'), towed from its front part by a tractor vehicle (not visible in the drawing), moves by means of a pair of side wheels (19) assembled in respective articulated arms (20), and the lifting device comprising operating cylinders (21), which are preferably hydraulic, extending between the articulated arms (20) for supporting the wheels (19) and other articulated arms (22) linking the material collection and accumulation hopper (18) and the structure of the machine (10').

As discussed, the machine of FIG. 6*a* is in the operative position, collecting materials on the leading edge LE for the operation of picking up rocks, and transferring the rocks from its trailing edge TE to the hopper (18). When the material accumulated in the hopper (18) is to be unloaded onto a trailer or other means of transport, the operation of the cylinders (21) allows the machine to take a position such as the one shown in FIG. 6*b*, such that the hopper (18) is now at a height that is sufficient for being emptied out in a trailer or means of transport of another type.

It will be understood that the lifting capacity of the machine with respect to the plane of the ground can also be utilized to separate the leading edge LE from the plane of the ground and thereby allow the machine to move from one position to another.

Figure 7:
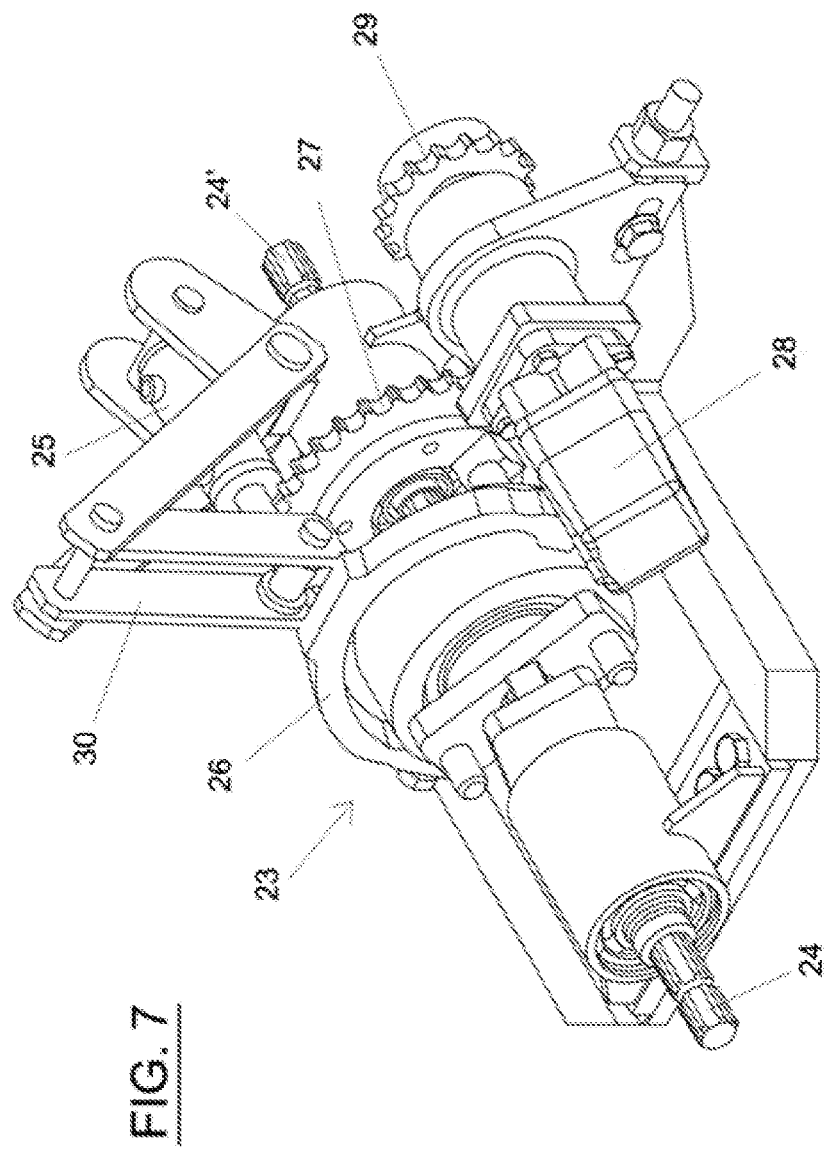
FIG. 7 is a schematic depiction of an embodiment of a double clutch device for the optional incorporation thereof in the machine of the invention.

Now referring to FIG. 7 of the drawings, said figure schematically depicts a double clutch unit (23) provided specifically for the optional incorporation thereof in the machine, in a position sandwiched between the power take-off of the tractor vehicle and the input of a double-output gear reducer to the outputs of which the conveyor belt (36) and other movable elements (reel (100), ejector device (11)) are connected. Therefore, the force transmitted through the input shaft portion (24) to the output shaft portion (24') is controlled by a double clutch which is activated by means of a cylinder (25) which, through an articulated fork (26) in the actual structure of the unit, can longitudinally move the clutch mechanism and its associated sprocket (27) (main sprocket) through an articulated connecting rod mechanism (30). A hydraulic motor (28) has been provided on the sides, the actuation of which motor (28) rotates a secondary sprocket (29) linked to the shaft of the motor and capable of operatively meshing with the main sprocket (27).

In the position shown in FIG. 7, the rotational movement transmitted to the output shaft portion (24') from the input shaft portion (24) is performed in the same direction of rotation of the latter. However, by means of actuating the cylinder (25), the movement of the sprocket (27) and subsequent disengagement of the input shaft (24) are caused, leading the sprocket (27) to mesh with the sprocket (29), and now receiving movement from the motor (28) the rotation of which occurs in the direction opposite the direction communicated through the input shaft (24), and therefore transferring this rotation in the opposite direction to the output shaft (24'). Rotation is thereby reversed without having to decouple the machine from the power take-off of the tractor vehicle, and the benefit of being able to unjam the machine if needed is furthermore achieved. Of course when the cylinder (25) is returned to its initial position, the output shaft (24') again rotates in the same direction as the input shaft (24).

Figure 8:
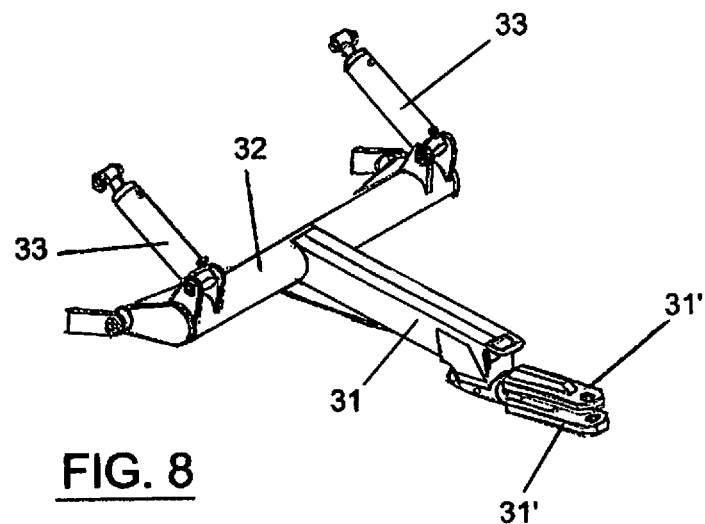
FIG. 8 is a schematic illustration of a mechanism for adjusting the working depth incorporated in the rock picker of the invention.

According to an embodiment of the rock picker of the invention, it has been provided that the machine can optionally incorporate means for regulating and adjusting the working depth by means of the positional regulation of the hitching means for hitching with the tractor vehicle. FIG. 8 shows an example of a mechanism susceptible to being incorporated in the rock picker, which is made up of a hitching bar (31) with a front end (31') suitable for being fixed to the rear hitch of the tractor, and is provided at the opposite end with a transverse bar (32) from which a pair of cylinders (33) emerges, one at each end of the transverse bar (32), positioned such that when hydraulically operated by the driver of the vehicle and the respective rods thereof are extended, the controlled downward movement of the structure (10*a*) of the rock picker can be caused and the driving depth of the teeth (1) thereby controlled.

Figure 9:
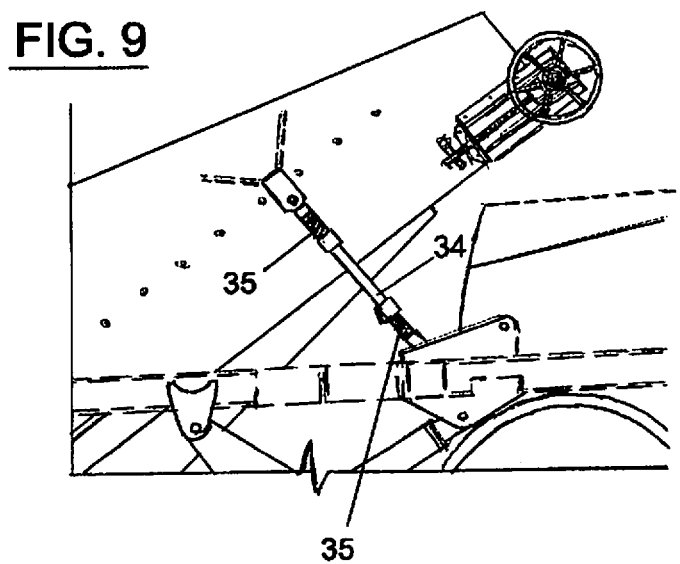
FIG. 9 depicts a schematic side elevational view of a turnbuckle device that can be used for packing up the machine.

Additionally, in a manner complementary to the embodiment shown in FIGS. 6*a* and 6*b* of the attached drawings, the machine of the invention can incorporate a packing up mechanism which allows reducing the volume thereof enough so that it can be introduced in a container for transport purposes or the like. FIG. 9 shows an example of an optional packing up mechanism, made up of one or more packing up turnbuckles located on the sides of the machine, extending between the lifting device and the main chassis of the machine, where each packing up mechanism turnbuckle comprises a central cylindrical body (34) which is linked at its ends in a screw-like manner to respective threaded rods (35) in reverse directions, articulated at the positions for the anchoring thereof with the lifting device and the main chassis of the machine. Therefore, with the rotation of the mentioned central cylindrical body (34) the distance between the ends of the turnbuckle is reduced or increased, depending on the direction of rotation imparted to the central body 34, and the machine is thereby taken to different positional heights, including maximum packing up, i.e., minimal height, which is enough to allow it to be introduced in a container, as mentioned.

Figure 10:
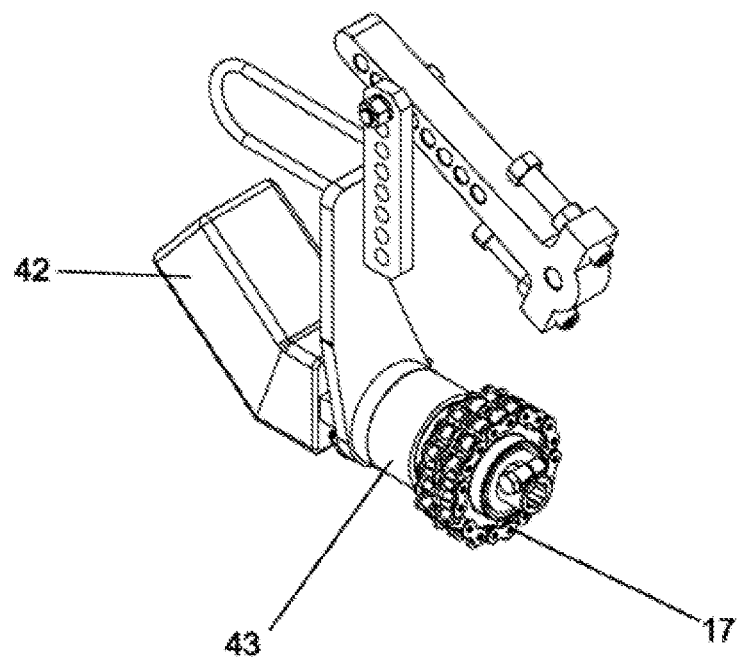
FIG. 10 depicts the drive mechanism for driving the rotating elements of the machine applied to the operation of the side chains of the conveyor belt.

Finally, and making reference to FIG. 10, said figure shows the drive mechanism for driving the rotating elements of the machine (conveyor belt (36) and reel (100)). Said mechanism comprises a hydraulic pump (42) providing the pressure required for the operation of the corresponding hydraulic motors (43) operating these elements. Specifically, FIG. 10 shows the hydraulic pump (42) coupled to the hydraulic motor (43) operating the side chains (17) of the conveyor belt (36).

It is not considered necessary to extend the content of the present description so that one skilled in the art will be able to understand its scope and the advantages derived from it, as well as to carry out the practical embodiment of the subject-matter thereof.

What is claimed is:

1. A machine for picking up rocks from soils, comprising:
a structure comprising a pair of side wheels, configured to be towed by a tractor;
wherein the structure is connected to a power take-off of the tractor;
teeth, for rock extraction and uprooting, incorporated on an advancing edge of the structure,
a rotating feed reel with teeth;
a conveyor belt for lifting said rocks up through an inclined plane from a leading edge to a trailing edge located at a greater height;
a rock collection and accumulation hopper on the trailing edge; and
an ejector device between the trailing edge of the conveyor belt and the hopper, for breaking up clods and sieving driven materials;
said ejector device comprising a metal frame comprising a plurality of blades successively attached to a rotating shaft;
a first series of counter-blade portions extending from a side of a frame towards and in alternating positions with respect to the blades;
a second series of counter-blade portions extending from an opposite side of the frame, said second series of counter-blade portions are opposite to the first series of counter-blade portions, said second series of counter-blade portions extend away and in alternating positions with respect to the blades; and
wherein the plurality of blades are configured to pass through spaces between the counter-blade portions.

2. The machine for picking up rocks from soils according to claim 1, wherein a movable feed reel is assembled on swinging side arms.

3. The machine for picking up rocks from soils according to claim 1, further comprising:
guiding devices for respective side chains of the conveyor belt;
each device comprising a rigid upright, provided at one of a device's ends with means for coupling to the structure of the machine and fixing by means of screws into a tubular sleeve inside which the rigid upright is able to move;
whereas at an opposite end of said device comprises an orthogonal shaft holding a sprocket wheel with which corresponding side chain meshes.

4. The machine for picking up rocks from soils according to claim 3, wherein the side chains are held on a plurality of guiding rollers.

5. The machine for picking up rocks from soils according to claim 3, wherein the conveyor belt comprises rods assembled between the side chains, leaving gaps for screening dirt.

6. The machine for picking up rocks from soils according to claim 5, wherein the rods are telescopic and have an expansion spring for assembly and disassembly thereof between links of the side chains.

7. The machine for picking up rocks from soils according to claim 6, further comprising closing skirts for closing the conveyor belt's sides to protect the side chains and guiding rollers.

8. The machine for picking up rocks from soils according to claim 1, wherein the conveyor belt comprises transverse restraints to improve the upward driving of uprooted material.

9. The machine for picking up rocks from soils according to claim 1, further comprising a lifting device for unloading materials onto means of transport; said lifting device comprising operating cylinders extending between articulated arms; wherein the articulated arms have arm ends comprising ground-supported side wheels of the machine, and other articulated arms linking the hopper and the structure of the machine.

10. The machine for picking up rocks from soils according to claim 9, further comprising a double clutch sandwiched between the power take-off of the tractor vehicle and an input of a double-output gear reducer operating movable elements of the machine; said double clutch comprising a cylinder associated with an articulated fork for longitudinally moving a clutch mechanism and its main sprocket through an articulated connecting rod mechanism; laterally comprising a reverse-rotation hydraulic motor coupled to a secondary sprocket and capable of operatively meshing with the main sprocket.

11. The machine for picking up rocks from soils according to claim 1, further comprising a mechanism for adjusting the working depth of the teeth which is made up of a hitching bar with a front end suitable for being fixed to a rear hitch of the tractor, and is provided at an opposite end with a transverse bar from which a pair of end cylinders emerges.

12. The machine for picking up rocks from soils according to claim 9, further comprising a packing up mechanism to allow being introduced inside a container for transport purposes; said packing up mechanism comprising one or more turnbuckles located on a side of the machine, extending between the lifting device and a main chassis of the machine, each turnbuckle having a central cylindrical body which is attached at its ends in a screw-like manner, with reverse direction threads, to respective threaded rods anchored in an articulated manner between the machine and the lifting device.

* * * * *